(12) United States Patent
Dwertmann et al.

(10) Patent No.: US 9,343,914 B2
(45) Date of Patent: May 17, 2016

(54) SYSTEM AND METHOD FOR CHARGING THE ENERGY STORAGE CELLS OF AN ENERGY STORAGE DEVICE

(71) Applicant: Robert Bosch GmbH, Stuttgart (DE)

(72) Inventors: Ingo Dwertmann, Heilbronn (DE); Peter Feuerstack, Ludwigsburg (DE); Karlheinz Lunghard, Buehl (DE); Wolfgang Haas, Stuttgart (DE); Erik Weissenborn, Stuttgart (DE); Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 14/367,345

(22) PCT Filed: Oct. 24, 2012

(86) PCT No.: PCT/EP2012/071050
§ 371 (c)(1),
(2) Date: Jun. 20, 2014

(87) PCT Pub. No.: WO2013/091951
PCT Pub. Date: Jun. 27, 2013

(65) Prior Publication Data
US 2014/0340052 A1 Nov. 20, 2014

(30) Foreign Application Priority Data
Dec. 20, 2011 (DE) .......................... 10 2011 089 312

(51) Int. Cl.
*H02J 7/04* (2006.01)
*H02J 7/16* (2006.01)
(Continued)

(52) U.S. Cl.
CPC ........... *H02J 7/0021* (2013.01); *B60L 11/1853* (2013.01); *B60L 11/1855* (2013.01);
(Continued)

(58) Field of Classification Search
CPC ...................................... Y02E 60/12
USPC ....................................... 320/162
See application file for complete search history.

(56) References Cited

U.S. PATENT DOCUMENTS

| 5,642,275 A | 6/1997 | Peng et al. |
| 2004/0169492 A1 | 9/2004 | Aumayer et al. |

(Continued)

FOREIGN PATENT DOCUMENTS

| DE | 10157859 | 7/2002 |
| EP | 1947752 | 7/2008 |
| GB | 2080642 | 2/1982 |

OTHER PUBLICATIONS

International Search Report for Application No. PCT/EP2012/071050 dated Sep. 26, 2013 (English Translation, 3 pages).

*Primary Examiner* — Suresh Memula
(74) *Attorney, Agent, or Firm* — Michael Best & Friedrich LLP (57) ABSTRACT

The invention relates to a method for charging the energy storage cells of an energy storage device, which comprises: n first output connections, wherein n>1, for issuing a supply voltage at each of the output connections, a second output connection, wherein a charging device can be connected between the first output connections and the second output connection, and n parallel-connected energy supply branches, which are each coupled between a first output connection and the second output connection, wherein each of the energy supply branches comprises a plurality of series-connected energy storage modules, which each comprise an energy storage cell module comprising at least one energy storage cell, and a coupling device having coupling elements that are designed to selectively connect or bridge the energy storage cell module in the respective energy supply branch. The method according to the invention comprises the following steps: determining a maximum possible charging voltage of a charging apparatus, which provides a charging voltage for the energy storage device; determining the maximum number of the energy storage cell modules of an energy supply branch at which the sum of the output voltages of the energy storage cell modules, which is dependent on the instantaneous charge states of the energy storage cells of all the energy storage cell modules of an energy supply branch, is still lower than the maximum possible charging voltage; and selecting and controlling the coupling elements of energy storage modules of the energy supply branch, such that in each case only the maximum number of energy storage cell modules is coupled into the energy supply branch.

12 Claims, 3 Drawing Sheets

(51) Int. Cl.
  *H02J 7/00*   (2006.01)
  *H02M 7/49*   (2007.01)
  *B60L 11/18*  (2006.01)
  *H02M 7/483*  (2007.01)

(52) U.S. Cl.
  CPC ............ *B60L11/1864* (2013.01); *H02J 7/007* (2013.01); *H02J 7/0024* (2013.01); *H02M 7/49* (2013.01); *H02J 7/0052* (2013.01); *H02M 2007/4835* (2013.01); *Y02T 10/7005* (2013.01); *Y02T 10/7011* (2013.01); *Y02T 10/7055* (2013.01); *Y02T 10/7061* (2013.01)

(56) References Cited

U.S. PATENT DOCUMENTS

| | | | |
|---|---|---|---|
| 2011/0068738 A1* | 3/2011 | Gomi | B62J 1/005 320/108 |
| 2011/0198936 A1 | 8/2011 | Graovac et al. | |
| 2011/0273136 A1* | 11/2011 | Yoshimoto | H02M 1/10 320/103 |
| 2011/0305933 A1 | 12/2011 | Huang et al. | |
| 2013/0049703 A1* | 2/2013 | Perisic | H01M 10/44 320/162 |

* cited by examiner

SYSTEM AND METHOD FOR CHARGING THE ENERGY STORAGE CELLS OF AN ENERGY STORAGE DEVICE

BACKGROUND OF THE INVENTION

The invention relates to a system and a method for charging the energy storage cells of an energy storage device, particularly in a battery direct inverter circuit for supplying power to electric machines.

The trend is that, in the future, electronic systems that combine new energy storage technologies with electrical drive technology will be used increasingly both in stationary applications, such as wind power installations or solar installations, and in vehicles, such as hybrid or electric vehicles.

The supply of multiphase current to an electric machine is usually accomplished by a converter in the form of a pulse-controlled inverter. To this end, a DC voltage provided by a DC voltage intermediate circuit can be converted into a multiphase AC voltage, for example a three-phase AC voltage. In this case, the DC voltage intermediate circuit is powered by a line of battery modules connected up in series. In order to be able to meet the demands on power and energy for a respective application, a plurality of battery modules are frequently connected in series in a traction battery.

The document U.S. Pat. No. 5,642,275 A1 describes a battery system with an integrated inverter function. Systems of this kind are known by the name of multilevel cascaded inverter or else battery direct inverter (BDI). Such systems comprise DC sources in a plurality of energy storage module lines that can be connected directly to an electric machine or an electrical system. In this case, single-phase or polyphase supply voltages can be generated. The energy storage module lines have a plurality of series-connected energy storage modules in this case, each energy storage module having at least one battery cell and an associated controllable coupling unit that allows control signals to be taken as a basis for interrupting the respective energy storage module line or bypassing the respective associated at least one battery cell or connecting the respective associated at least one battery cell into the respective energy storage module line. Suitable actuation of the coupling units, e.g. using pulse width modulation, also allows suitable phase signals to be provided for controlling the phase output voltage, as a result of which it is possible to dispense with a separate pulse-controlled inverter. The pulse controlled inverter required for controlling the phase output voltage is therefore integrated in the BDI so to speak.

BDIs usually have a higher level of efficiency and a higher level of failsafety in comparison with conventional systems. Failsafety is ensured, inter alia, by the ability for faulty, failed or not fully effective battery cells to be disconnected from the energy supply lines by virtue of suitable bypass actuation of the coupling units. The phase output voltage of an energy storage module line can be varied, and, in particular, set in a stepped manner, by virtue of appropriate actuation of the coupling units. In this case, the step range of the output voltage is obtained from the voltage of a single energy storage module, with the maximum possible phase output voltage being determined by the sum of the voltages of all the energy storage modules in an energy storage module line.

SUMMARY OF THE INVENTION

According to one aspect, the present invention provides a method for charging energy storage cells in an energy storage device that has: n first output connections, wherein n≥1, for outputting a supply voltage at each of the output connections, a second output connection, wherein a charger can be connected between the first output connections and the second output connection, and n parallel-connected energy supply branches that are each coupled between a first output connection and the second output connection, wherein each of the energy supply branches has a multiplicity of series-connected energy storage modules that each comprise an energy storage cell module that has at least one energy storage cell, and a coupling device having coupling elements that are designed to selectively connect the energy storage cell module into the respective energy supply branch or bypass it. In this case, the method has the following steps: determination of a maximum possible charging voltage for a charger that provides a charging voltage for the energy storage device, determination of the maximum number of energy storage cell modules in an energy supply branch for which the sum of the output voltages from the energy storage cell modules, which output voltages are dependent on the instantaneous states of charge of the energy storage cells of all the energy storage cell modules in an energy supply branch, is still lower than the maximum possible charging voltage, and selection and actuation of the coupling elements of energy storage modules in the energy supply branch, so that only the maximum number of energy storage cell modules is ever coupled into the energy supply branch.

According to a further aspect, the present invention provides a system having an energy storage device that has n first output connections, wherein n≥1, for outputting a supply voltage at each of the output connections, a second output connection, wherein a charger can be connected between the first output connections and the second output connection, and n parallel-connected energy supply branches that are each coupled between a first output connection and the second output connection, wherein each of the energy supply branches has a multiplicity of series-connected energy storage modules that each comprise an energy storage cell module that has at least one energy storage cell, and a coupling device having coupling elements that are designed to selectively connect the energy storage cell module into the respective energy supply branch or bypass it. In addition, the system comprises a control device that is coupled to the coupling devices and that is designed to carry out an inventive method for charging the energy storage cells of the energy storage cell modules.

The concept of the present invention is to connect the energy storage cell modules of a controllable energy storage device to the energy supply branches in a specific manner during a charging operation, so that the required charging voltage varies in a predefined voltage framework throughout the entire charging operation. To this end, the state of charge of the respective energy storage cells can be ascertained in order to determine the required charging voltage per energy storage module therefrom and, as a result, to connect those energy storage modules whose accumulated required charging voltages correspond to the predefined voltage framework into the energy supply branch. In the case of energy storage cells with different states of charge, the respective energy storage cells to be charged can be cyclically exchanged.

A significant advantage of this arrangement is that the voltage range that needs to be covered over the entire charging operation for an energy storage device can be reduced. This affords the advantage that the chargers that are used for charging the energy storage cells may have a smaller output voltage range, which results firstly in savings in volume and production costs and secondly in improved efficiencies. The chargers may have smaller transformers, no longer need to be of multistage design and can accordingly be provided by cheaper and less challenging components. Efficiency is improved indirectly by reduced power losses. In addition, chargers having alternative topologies, for example resonant converters, can be used that, depending on design, permit only a small voltage spread.

A further advantage is that a charger can be used for different areas of use by virtue of suitable selection of the voltage range, for example for electric vehicles and hybrid vehicles in equal measure.

Moreover, a significant advantage is that different states of charge of energy storage cells, which can arise due to operation or due to aging, for example, can be compensated for during the charging operation itself without this requiring further cell balancing methods. This reduces the total charging time before a full state of charge for all the energy storage cells is reached.

According to one embodiment of the inventive method, it is also possible for cyclic exchange of the respective energy storage cell module coupled into the energy supply branch to be effected through selection and actuation of the coupling elements of respective other energy storage modules in the energy supply branch in predetermined time cycles. This allows all the energy storage modules to be charged uniformly without extending the charging time.

According to a further embodiment of the inventive method, it is also possible for actuation of the coupling elements of a further of the unselected energy storage modules in the energy supply branch to be effected at a variable duty ratio. The variable duty ratio matches the mean voltage required for this energy storage module to an instantaneous charging voltage. If, in one advantageous embodiment, the variable duty ratio is determined on the basis of the difference between the maximum possible charging voltage and the sum of the output voltages from the energy storage cell modules or the difference between the minimum possible charging voltage and the sum of the output voltages from the energy storage cell modules, it is possible for the charging voltage that needs to be provided by a charger to be advantageously kept constant.

According to a further embodiment of the inventive method, it is also possible for monitoring of the output voltages from the selected energy storage modules in the energy supply branch during the charging operation, and reduction of the determined maximum number of energy storage cell modules in an energy supply branch, to be effected if the sum of the output voltages from the selected energy storage cell modules exceeds a desired charging voltage, for example the maximum possible charging voltage. This advantageously makes it possible to remain in a predefined voltage range of the charger throughout the entire charging operation. Particularly if, according to an advantageous embodiment, the reduction of the determined maximum number of energy storage cell modules comprises the reduction of the number by one energy storage cell module in each case, it may be possible not just to remain below the maximum possible charging voltage at each instant of the charging operation but also always to maintain a charging voltage above a minimum possible charging voltage. This serves to reduce the necessary spread of the output voltage range for a charger.

According to a further embodiment of the inventive method, it is possible for monitoring of the output voltages from the selected energy storage modules in the energy supply branch during the charging operation, and actuation of the coupling elements of energy storage modules whose output voltages exceed a desired final voltage, for the purpose of permanently decoupling the energy storage modules from the energy supply branch during the remainder of the charging operation. This makes it possible to achieve the advantage that energy storage cell modules of different energy storage modules can be brought to different final voltages without adversely affecting the charging operation for the remainder of the energy storage cell modules of other energy storage modules in the same energy supply branch.

According to one embodiment of the inventive system, a charger may be provided that is coupled to the n first output connections and to the second output connection and that is designed to provide a charging voltage for the energy storage device in the voltage range between a minimum possible charging voltage and the maximum possible charging voltage.

According to a further embodiment of the inventive system, a changeover device may be provided that is coupled between the charger and the n first output connections and that is designed to selectively isolate the charger from the energy storage device. This advantageously allows the charger to be separated from the energy storage device during the operation of the energy storage device, for example following termination of the charging operation. In addition, the changeover device can be used to perform specific charging of individual energy supply branches.

According to a further embodiment of the inventive system, the coupling devices may comprise coupling elements in a full-bridge circuit.

According to a further embodiment of the inventive system, the coupling devices may comprise coupling elements in a half-bridge circuit.

BRIEF DESCRIPTION OF THE DRAWINGS

Further features and advantages of embodiments of the invention are obtained from the description below with reference to the appended drawings.

In the drawings.

DETAILED DESCRIPTION

Figure 1:
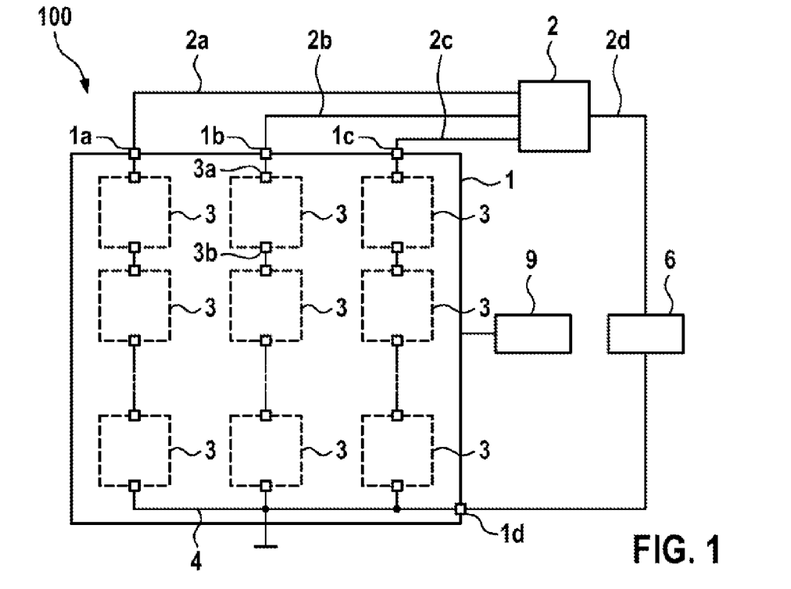
FIG. 1 shows a schematic illustration of a system having an energy storage device according to an embodiment of the present invention.

FIG. 1 shows a system 100 for the voltage conversion of DC voltage provided by energy storage modules 3 into an n-phase AC voltage. The system 100 comprises an energy storage device 1 having energy storage modules 3 that are connected in series in energy supply branches. Three energy supply branches are shown by way of example in FIG. 1, which are suitable for producing a three-phase AC voltage, for example for a three-phase machine 2. However, it is clear that any other number of energy supply branches may likewise be possible. At each energy supply branch, the energy storage device 1 has a first output connection 1*a*, 1*b*, 1*c*, which are respectively connected to phase lines 2*a*, 2*b* and 2*c*. By way of example, the system 100 in FIG. 1 is used for supplying power to a three-phase electric machine 2. However, provision may also be made for the energy storage device 1 to be used for producing an electric current for an energy supply system 2.

Furthermore, the system 100 may comprise a control device 9 that is connected to the energy storage device 1 and that can be used to control the energy storage device 1 in order to provide the desired output voltages at the respective first output connections 1*a*, 1*b*, 1*c*. In addition, the control device 9 may be designed to actuate the respective active switching elements of the energy storage device 1 when the energy storage cells of the energy storage device 1 are charged.

The energy supply branches can be connected at their end to a reference-ground potential 4 (reference-ground rail) that, in the embodiment shown, carries a mid potential with respect to the phase lines 2*a*, 2*b*, 2*c* of the electric machine 2. By way of example, the reference-ground potential 4 may be a ground potential. Each of the energy supply branches has at least two series-connected energy storage modules 3. By way of example, the number of energy storage modules 3 per energy supply branch is three in FIG. 1, but any other number of energy storage modules 3 is likewise possible. Preferably, each of the energy supply branches in this case comprises the same number of energy storage modules 3, but it is also possible to provide a different number of energy storage modules 3 for each energy supply branch.

The energy storage modules 3 each have two output connections 3*a* and 3*b* that can be used to provide an output voltage for the energy storage modules 3. Since the energy storage modules 3 are primarily connected in series, the output voltages from the energy storage modules 3 are summed to produce a total output voltage that can be provided at the respective one of the first output connections 1*a*, 1*b*, 1*c* of the energy storage device 1.

Figure 2:
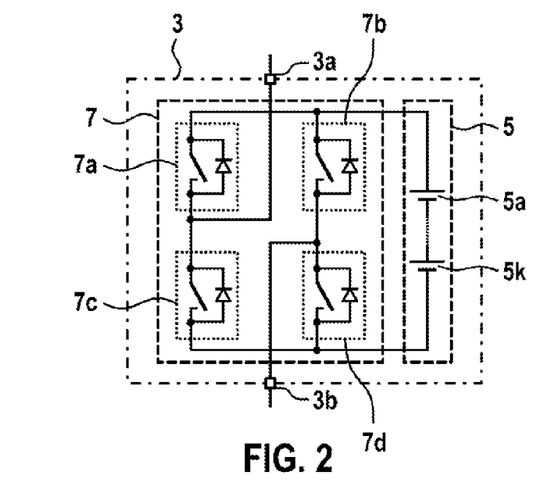
FIG. 2 shows a schematic illustration of an energy storage module of an energy storage device according to a further embodiment of the invention.
Figure 3:
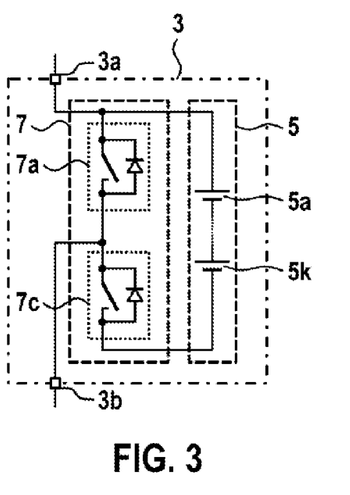
FIG. 3 shows a schematic illustration of an energy storage module of an energy storage device according to a further embodiment of the invention.

Exemplary designs of the energy storage modules 3 are shown in greater detail in FIGS. 2 and 3. In this case, the energy storage modules 3 each comprise a coupling device 7 having a plurality of coupling elements 7*a*, 7*c* and also possibly 7*b* and 7*d*. In addition, the energy storage modules 3 each comprise an energy storage cell module 5 having one or more series-connected energy storage cells 5*a* to 5*k*.

In this case, the energy storage cell module 5 may have, by way of example, series-connected batteries 5*a* to 5*k*, for example lithium ion batteries. The number of energy storage cells 5*a* to 5*k* in the energy storage modules 3 shown in FIGS. 2 and 3 is in this case two, for example, but any other number of energy storage cells 5*a* to 5*k* is likewise possible.

The energy storage cell modules 5 are connected to input connections of the associated coupling device 7 via connecting lines. By way of example, the coupling device 7 in FIG. 2 is in the form of a full-bridge circuit with two coupling elements 7*a*, 7*c* and two coupling elements 7*b*, 7*d* in each instance. In this case, the coupling elements 7*a*, 7*b*, 7*c*, 7*d* may each have an active switching element, for example a semiconductor switch, and a freewheeling diode connected in parallel therewith. In this case, provision may be made for the coupling elements 7*a*, 7*b*, 7*c*, 7*d* to be in the form of MOSFET switches, which already have an intrinsic diode. Alternatively, it is possible for just two couplings elements 7*a*, 7*c* to be produced in each case, so that—as shown by way of example in FIG. 3—a half-bridge circuit is provided.

The coupling elements 7*a*, 7*b*, 7*c*, 7*d* can be actuated, for example by means of the control device 9 shown in FIG. 1, such that the respective energy storage cell module 5 is selectively connected between the output connections 3*a* and 3*b* or such that the energy storage cell module 5 is bypassed. With reference to FIG. 2, the energy storage cell module 5 can be connected between the output connections 3*a* and 3*b* in the forward direction, for example, by virtue of the active switching element of the coupling element 7*d* and the active switching element of the coupling element 7*a* being put into a closed state while the other two active switching elements of the coupling elements 7*b* and 7*c* are put into an open state. By way of example, a bypass state can be set by virtue of the two active switching elements of the coupling elements 7*a* and 7*b* being put into a closed state while the two active switching elements of the coupling elements 7*c* and 7*d* are kept in an open state. Similar considerations can be employed for the half-bridge circuit in FIG. 3.

Suitable actuation of the coupling devices 7 therefore allows individual energy storage cell modules 5 of the energy storage modules 3 to be integrated specifically into the series circuit of an energy supply branch. This may be particularly for the specific actuation of the coupling devices 7 for the purpose of selectively connecting the energy storage cell modules 5 of the energy storage modules 3 into the energy supply branches during a charging operation for the energy storage cells 5 of the energy storage modules 3.

For a charging operation for the energy storage cells 5*a* to 5*k* of each of the energy storage cell modules 5 of the energy storage modules 3, a charger 6 may be provided that, in the exemplary embodiment of FIG. 1, is connected via a first charging connection 2*d* to a star point on the electric machine 2, on the one hand, and a supply voltage for charging the energy storage cells 5*a* to 5*k* is connected via a second output connection 1*d* of the energy storage device 1, on the other hand. Alternatively, the charger 6 may also be an external electrical energy source such as an electrical energy system or the like, for example.

Figure 4:
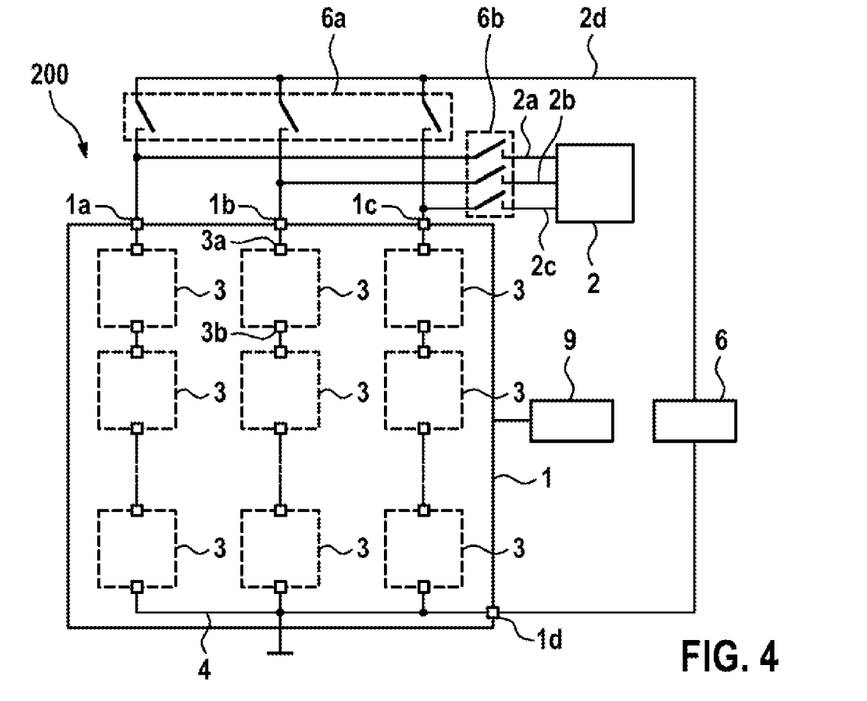
FIG. 4 shows a schematic illustration of a system with an energy storage device according to a further embodiment of the invention.

FIG. 4 shows a schematic illustration of a further system 200 for the voltage conversion of DC voltage provided by energy storage modules 3 into an n-phase AC voltage. The system 200 differs from the system 100 shown in FIG. 1 essentially in that the charging connection 2*d* of the charger 6 is coupled directly to the first output connections 1*a*, 1*b*, 1*c* of the individual energy supply branches of the energy storage device 1. To this end, the charging connection may be coupled to the first output connections 1*a*, 1*b*, 1*c* via a first changeover device 6*a*, for example. The first changeover device 6*a* may have semiconductor switches, for example, that can be connected when the energy storage cell modules 5 of the energy storage device 1 are meant to be charged. In addition, a second changeover device 6*b* can be produced between the first output connections 1*a*, 1*b*, 1*c* of the energy storage device 1 and the phase connections of the electric machine 2, said changeover device being designed to decouple the electric machine 2 from the energy storage device 1 during a charging operation for the energy storage device 1 in order to avoid the occurrence of unwanted currents and hence possibly torques in the electric machine. The second changeover device 6*b* may also have semiconductor switches, for example, that can be opened for a charging operation.

Figure 5:
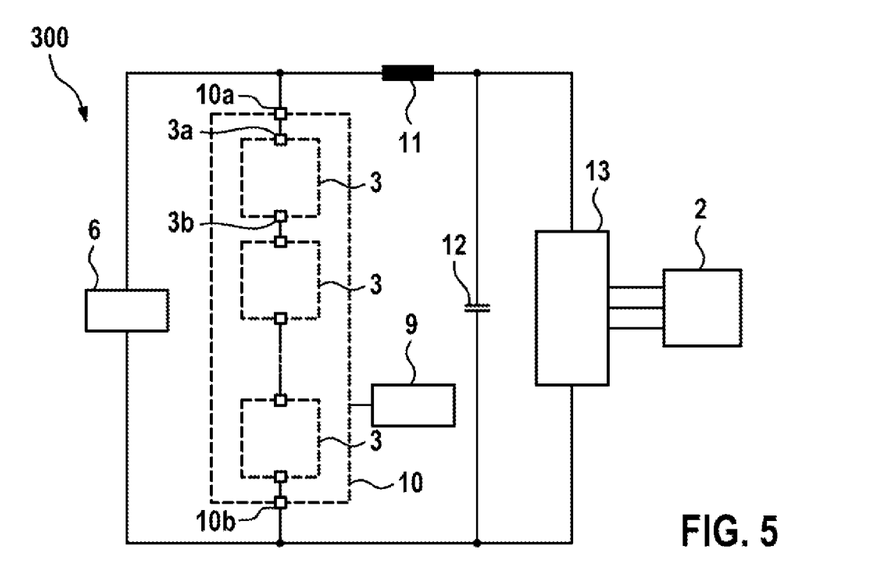
FIG. 5 shows a schematic illustration of a system with an energy storage device according to a further embodiment of the invention.

FIG. 5 shows a schematic illustration of a further system 400. In this regard, the system 400 has an energy storage device 10 that can be coupled to input connections of an inverter 13 via a first output connection 10a and a second output connection 10b. The energy storage device 10 may have one or more energy supply branches of series-connected energy storage modules 3, as shown by way of example in FIGS. 2 and 3. The energy storage device 10 and the inverter 13 may have an LC filter coupled between them, for example, which has an intermediate circuit capacitor 12 and an energy storage inductor 11. By way of example, the inverter 13 can use a pulse width modulation method (PWM) to provide an AC voltage, for example a three-phase AC voltage for an electric machine 2. To this end, the inverter 13 can be supplied with a DC voltage from the intermediate circuit capacitor 12, which is in turn powered from the energy storage device 10.

A charger 6 for charging the energy storage cell modules 5 of the energy storage device 10 can be coupled across the output connections 10a and 10b, for example. For a charging operation, a control device 9 may be provided that is coupled to the energy storage device 10 and that is designed to connect the energy storage cell modules 5 of the energy storage device 10 specifically into the energy supply branches or the energy supply branch of the energy storage device 10 by means of selective actuation of the coupling devices 7 of the energy storage modules 3 of the energy storage device 10.

Figure 6:
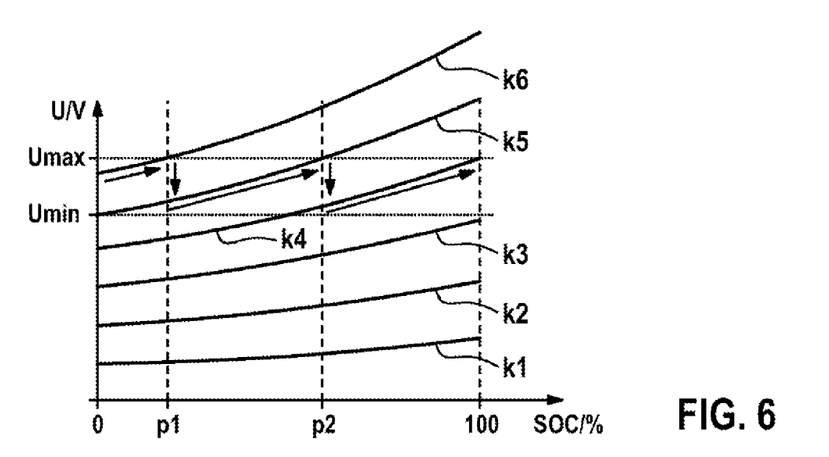
FIG. 6 shows a schematic illustration of an actuation strategy for an energy storage device for charging energy storage cells of the energy storage device according to a further embodiment of the invention.
Figure 7:
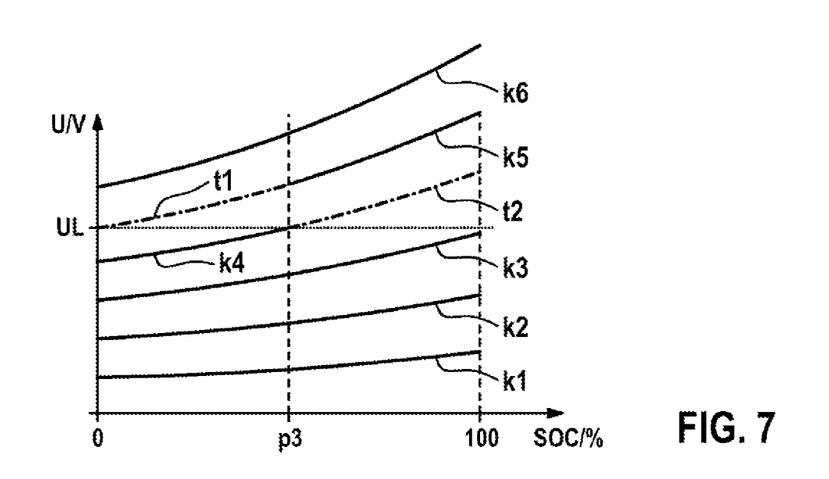
FIG. 7 shows a schematic illustration of an actuation strategy for an energy storage device for charging energy storage cells of the energy storage device according to a further embodiment of the invention.

FIG. 6 shows a schematic illustration of an actuation strategy for an energy storage device for charging energy storage cells of the energy storage device, particularly energy storage cells 5a to 5k of the energy storage device 1 in FIG. 1 or 4 or the energy storage device 10 in FIG. 5. FIG. 7 shows a schematic illustration of a further actuation strategy for an energy storage device for charging energy storage cells of the energy storage device, particularly energy storage cells 5a to 5k of the energy storage device 1 in FIG. 1 or 4 or the energy storage device 10 in FIG. 5.

FIGS. 6 and 7 each show an exemplary voltage graph that illustrates the voltage U of energy storage cells in comparison with the state of charge SOC of the energy storage cells. By way of example, lithium ion batteries have a basic voltage that is greater than zero volt in the completely discharged state, that is to say that SOC=0%. In order to charge such a lithium ion battery, it is necessary to provide at least this basic voltage. As the state of charge increases, the output voltage of the lithium ion battery increases up to a rated voltage at a state of charge SOC of 100%. When lithium ion batteries are in a series circuit, these values increase accordingly.

By way of example, a voltage profile k1 for a series circuit comprising energy storage cells 5a to 5k of an energy storage cell module 5 is shown in FIGS. 6 and 7. When a plurality of energy storage cell modules 5 are connected in series in an energy supply branch, corresponding voltage profiles k2, k3, k4, k5 and k6 are obtained. By way of example, the voltage profiles can be ascertained by measuring the output voltages of energy storage cells at different states of charge, and can be stored in the control device of the energy storage device as reference values.

In FIG. 6, a charging operation begins with a state of charge for the energy storage cells first of all being ascertained. By way of example, the state of charge of all the energy storage cells is 0%, so that first of all the initially necessary charging voltage for a value of SOC=0% is ascertained. When the state of charge of the energy storage cells is more than 0%, a similar perspective applies. In the example, the number of energy storage cell modules is ascertained for which the sum of the output voltages of the energy storage cell modules is only just lower than a maximum possible charging voltage Umax. The maximum possible charging voltage Umax can be prescribed by the charger used, and may be between 200 volts and 450 volts, for example, other values naturally likewise being possible. In addition, the charger has a voltage spread, that is to say that the charger can provide a charging voltage range between a minimum possible charging voltage Umin and the maximum possible charging voltage Umax. In this case, the minimum possible charging voltage Umin should be lower than the sum of the basic voltages of all the energy storage cells in the completely discharged state, since otherwise it is not possible to ensure that a charging operation can be initiated in every case. It may naturally be possible in this case for the values of the minimum possible charging voltage Umin and the maximum possible charging voltage Umax to be flexibly matched to the desired charging situation, that is to say that it is not absolutely necessary for the values of the minimum possible charging voltage Umin and the maximum possible charging voltage Umax to be prescribed by the technical circumstances of the charger.

In the present example in FIG. 6, the voltage profile k6 is that whose sum of the output voltages at SOC=0% given the maximum number of energy storage cell modules is only just lower than the maximum possible charging voltage Umax. If this number corresponds to the total number of all the energy storage cell modules in the respective energy supply branch under consideration, it is simply possible to begin charging all the energy storage cell modules. If this number is smaller than the total number of all the energy storage cell modules in the respective energy supply branch under consideration, however, it is necessary to select energy storage cell modules, as explained further below.

When the charging operation has begun, the state of charge of the energy storage cells rises, so that to a particular degree the necessary charging voltage for the energy storage cells also rises, as shown in FIG. 6. In a particular state of charge SOC=p1, this necessary charging voltage for the energy storage cells precisely reaches the value of the maximum possible charging voltage Umax. In this case, the number of energy storage cell modules that are being charged simultaneously is reduced, so that now the voltage profile k5 of the reduced number of energy storage cell modules is critical for the charging voltage. By way of example, the voltage profile k5 may correspond to the number of energy storage cell modules that is reduced by one in comparison with the number of energy storage cell modules that is associated with the voltage profile k6.

In the next charging profile, no longer are all the energy storage cell modules simultaneously supplied with charging voltage. It is therefore necessary to ensure that all the energy storage cell modules remains in an identical state of charge by virtue of the active energy storage cell modules being cyclically exchanged. To this end, new active energy storage cell modules can be selected on the basis of predetermined time cycles, so that on average each of the energy storage cell modules is supplied with the charging voltage over an identical cumulated period of time.

For a state of charge of SOC=p2, the process is repeated again, so that in the example in FIG. 6 the completely charged state of SOC=100% is effected with the simultaneous charging of a number of energy storage cell modules that corresponds to the voltage profile k4.

FIG. 7 shows a further modification of the actuation strategy from FIG. 6. First of all, the maximum number of energy storage cell modules that is only just lower than a desired charging voltage UL, for example the maximum possible charging voltage Umax, or the minimum possible charging voltage Umin, is determined again at the beginning of the charging operation. In the example in FIG. 7, this number corresponds to the number associated with the voltage profile k4. At the same time, however, a further energy storage cell module is actuated with a variable duty ratio t1, which can be formed on the basis of the difference between the charging voltage UL and the sum of the output voltages from the energy storage cell modules that is determined by the voltage profile k4. This equalizes precisely the differential voltage between charging voltage UL and the voltage profile k4 on average, for which reason the charging voltage UL can be kept at a constant value. For a state of charge of SOC=p3, the number of energy storage cell modules that are permanently connected into the energy supply branch at the same time is in turn reduced. Otherwise, in a similar manner to in FIG. 6, all the energy storage cell modules that are permanently connected into the energy supply branch at the same time are again cyclically exchanged in FIG. 7. A further one of the energy storage cell modules is then actuated with a variable duty ratio t2 from the state of charge SOC=p2 onward.

In the previous explanations, it has been assumed by way of example that the voltage profiles k1 to k6 each relate to sums of identical states of charge for the energy storage cell modules, that is to say that each of the energy storage cell modules is brought to the same final state of charge or the same final voltage by a charging operation. The actuation strategies detailed above may also allow various energy storage cell modules to be brought to various final states of charge or final voltages. In this case, voltage profiles can be obtained that differ from the voltage profiles shown in FIGS. 6 and 7.

By way of example, the output voltages from the selected energy storage modules of the energy supply branch can be monitored during the charging operation. If it is found that the output voltages from particular energy storage modules exceed a desired final voltage, the coupling elements of these energy storage modules can then be actuated such that the energy storage modules are permanently decoupled from the energy supply branch, that is to say during the remainder of the charging operation. Since energy storage cell modules of various energy storage modules can be selectively coupled into the energy supply branch, each of the energy storage cell modules can be brought to a different final voltage without adversely affecting the charging operation for the remainder of the energy storage cell modules of other energy storage modules in the same energy supply branch.

Figure 8:
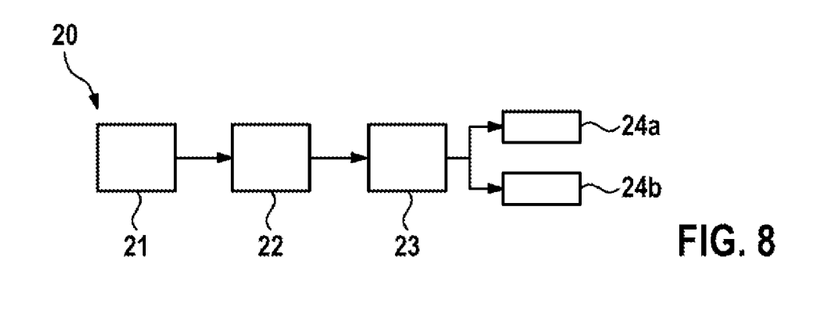
FIG. 8 shows a schematic illustration of a method for charging energy storage cells of an energy storage device according to a further embodiment of the present invention.

The actuation strategies shown schematically and by way of example in FIGS. 6 and 7 can be used to perform a method 20—shown schematically in FIG. 8—for charging the energy storage cells of an energy storage device, particularly of the energy storage device 1 in FIG. 1 or 4 or the energy storage device 10 in FIG. 5.

In a first step 21 of the method 20, a maximum possible charging voltage Umax for a charger 6 that provides a charging voltage UL for the energy storage device 1 or 10 is determined. In a second step 22, the maximum number of energy storage cell modules 5 in an energy supply branch for which the sum of the output voltages from the energy storage cell modules 5, which output voltages are dependent on the instantaneous states of charge of the energy storage cells 5a to 5k of all the energy storage cell modules 5 in an energy supply branch, is still lower than the maximum possible charging voltage Umax is determined.

Next, a step 23 involves selection of which coupling elements 7a, 7b, 7c, 7d of energy storage modules 3 in the energy supply branch are actuated, so that in each case only the maximum number—determined in step 22—of energy storage cell modules 5 is coupled into the energy supply branch. It may also be possible to monitor the output voltages of the selected energy storage modules 3 in the energy supply branch during the charging operation, so that if the sum of the output voltages of the selected energy storage cell modules 5 exceeds the maximum possible charging voltage Umax, it is possible for the determined maximum number of energy storage cell modules 5 in an energy supply branch to be reduced. The number can be reduced incrementally, for example, that is to say that the number of selected energy storage cell modules 5 can be decreased by one each time the maximum possible charging voltage Umax is found to have been exceeded. This continually maximizes the number of energy storage cell modules 5 that currently need to be charged simultaneously, so that the total charging time for a charging operation can be minimized.

In a step 24a, the respective energy storage cell modules 5 coupled into the energy supply branch can be cyclically exchanged by selecting and actuating the coupling elements 7a, 7b, 7c, 7d of respective other energy storage modules 3 in the energy supply branch in predetermined time cycles. This allows uniform charging of all the energy storage cell modules 5. At the same time, provision may be made for a step 24b to involve actuation of the coupling elements 7a, 7b, 7c, 7d of a further one of the unselected energy storage modules 3 in the energy supply branch using a variable duty ratio. If the variable duty ratio is determined on the basis of the difference of the maximum possible charging voltage Umax and the sum of the output voltages from the energy storage cell modules 5, it is possible for the charging voltage UL to be advantageously kept at a constant value, since precisely the differential voltage between maximum possible charging voltage and the stepped summed output voltage from currently selected energy storage modules 3 can be set, on average, on the energy storage modules 3 actuated with the variable duty ratio.

The invention claimed is:

1. A method (10) for charging energy storage cells (5a, 5k) in an energy storage device (1) that has:
   n first output connections (1a, 1b, 1c; 10a), wherein n≥1, for outputting a supply voltage at each of the output connections (1a, 1b, 1c; 10a);
   a second output connection (1d; 10b), wherein a charger (6) can be connected between the first output connections (1a, 1b, 1c; 10a) and the second output connection (1d; 10b); and
   n parallel-connected energy supply branches that are each coupled between a first output connection (1a, 1b, 1c; 10a) and the second output connection (1d; 10b), wherein each of the energy supply branches has a multiplicity of series-connected energy storage modules (3) that each comprise:
      an energy storage cell module (5) that has at least one energy storage cell (5a, 5k), and
      a coupling device (7) having coupling elements (7a, 7b, 7c, 7d) that are designed to selectively connect the energy storage cell module (5) into the respective energy supply branch or bypass it,
   wherein the method (10) has the steps of:
   determination (21) of a maximum possible charging voltage (Umax) for a charger (6) that provides a charging voltage (UL) for the energy storage device (1; 10);
   determination (22) of the maximum number of energy storage cell modules (5) in an energy supply branch for which the sum of output voltages from the energy storage cell modules (5), which output voltages are dependent on the instantaneous states of charge of the energy storage cells (5a, 5k) of all the energy storage cell modules (5) in an energy supply branch, is still lower than the maximum possible charging voltage (Umax); and selection and actuation (23) of the coupling elements (7a, 7b, 7c, 7d) of energy storage modules (3) in the energy supply branch, so that only the maximum number of energy storage cell modules (5) is ever coupled into the energy supply branch.

2. The method (20) as claimed in claim 1, also having the step of:

cyclic exchange (24a) of the respective energy storage cell modules (5) coupled into the energy supply branch through selection and actuation of the coupling elements (7a, 7b, 7c, 7d) of respective other energy storage modules (3) in the energy supply branch in predetermined time cycles.

3. The method (20) as claimed in claim 1, also having the step of:

actuation (24b) of the coupling elements (7a, 7b, 7c, 7d) of a further of the unselected energy storage modules (3) in the energy supply branch at a variable duty ratio (t1; t2).

4. The method (20) as claimed in claim 3, wherein the variable duty ratio (t1; t2) is determined on the basis of the difference between the maximum possible charging voltage (Umax) and the sum of the output voltages from the energy storage cell modules (5) or the difference between the minimum possible charging voltage (Umin) and the sum of the output voltages from the energy storage cell modules (5).

5. The method (20) as claimed in claim 1, also having the steps of:

monitoring of the output voltages from the selected energy storage modules (3) in the energy supply branch during the charging operation; and reduction of the determined maximum number of energy storage cell modules (5) in an energy supply branch, if the sum of the output voltages from the selected energy storage cell modules (5) exceeds a desired charging voltage.

6. The method (20) as claimed in claim 5, wherein the reduction of the determined maximum number of energy storage cell modules (5) comprises the reduction of the number by one energy storage cell module (5) in each case.

7. The method (20) as claimed in claim 1, also having the steps of:

monitoring of the output voltages from the selected energy storage modules (3) in the energy supply branch during the charging operation; and actuation of the coupling elements (7a, 7b, 7c, 7d) of energy storage modules (3) whose output voltages exceed a desired final voltage, for the purpose of permanently decoupling the energy storage modules (3) from the energy supply branch during the remainder of the charging operation.

8. A system (100; 200; 300) having:

an energy storage device (1; 10) that has:

n first output connections (1a, 1b, 1c; 10a), wherein n≥1, for outputting a supply voltage at each of the output connections (1a, 1b, 1c; 10a);

a second output connection (1d; 10b), wherein a charger (6) can be connected between the first output connections (1a, 1b, 1c; 10a) and the second output connection (1d; 10b); and n parallel-connected energy supply branches that are each coupled between a first output connection (1a, 1b, 1c; 10a) and the second output connection (1d; 10b), wherein each of the energy supply branches has a multiplicity of series-connected energy storage modules (3) that each comprise:

an energy storage cell module (5) that has at least one energy storage cell (5a, 5k), and a coupling device (7) having coupling elements (7a, 7b, 7c, 7d) that are designed to selectively connect the energy storage cell module (5) into the respective energy supply branch or bypass it; and a control device (9) that is coupled to the coupling devices (7) and that is designed to carry out a method for charging the energy storage cells (5, 5k) of the energy storage cell modules (5) as claimed in claim 1.

9. The system (100; 200; 300) as claimed in claim 8, also having:

a charger (6) that is coupled to the n first output connections (1a, 1b, 1c; 10a) and to the second output connection (1d; 10b) and that is designed to provide a charging voltage for the energy storage device (1; 10) in the voltage range between a minimum possible charging voltage (Umin) and the maximum possible charging voltage (Umax).

10. The system (100; 200; 300) as claimed in claim 9, also having:

a changeover device (6a) that is coupled between the charger (6) and the n first output connections (1a, 1b, 1c; 10a) and that is designed to selectively isolate the charger (6) from the energy storage device (1; 10).

11. The system (100; 200; 300) as claimed in claim 8, wherein the coupling devices (7) comprise coupling elements (7a, 7b, 7c, 7d) in a full-bridge circuit.

12. The system (100; 200; 300) as claimed in claim 8, wherein the coupling devices (7) comprise coupling elements (7a, 7c) in a half-bridge circuit.

* * * * *